(12) United States Patent
Mikhemar et al.

(10) Patent No.: US 8,977,222 B2
(45) Date of Patent: Mar. 10, 2015

(54) PHASE-NOISE REDUCTION TECHNIQUE USING FREQUENCY-TO-CURRENT CONVERSION WITH BASEBAND INTEGRATION

(71) Applicant: Broadcom Corporation, Irvine, CA (US)

(72) Inventors: Mohyee Mikhemar, Aliso Viejo, CA (US); David Murphy, Costa Mesa, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 11 days.

(21) Appl. No.: 13/681,316

(22) Filed: Nov. 19, 2012

(65) Prior Publication Data

US 2014/0141739 A1    May 22, 2014

(51) Int. Cl.
*H04B 17/00*    (2006.01)
*H04B 1/10*     (2006.01)

(52) U.S. Cl.
CPC ................................. *H04B 17/0055* (2013.01)
USPC ......... 455/296; 455/226.1; 455/310; 455/317

(58) Field of Classification Search
CPC .. G01R 27/28; G01R 31/31709; G01R 29/26; H03L 7/18; H03L 7/099; H03K 3/013; H03K 17/16; H03K 19/00361; H03K 5/1252; H04W 16/18
USPC ............................... 455/226.1, 296, 310, 317
See application file for complete search history.

(56) References Cited

U.S. PATENT DOCUMENTS

| | | | |
|---|---|---|---|
| 5,053,714 A * | 10/1991 | Durand ......................... 324/613 |
| 6,509,802 B2 * | 1/2003 | Kasperkovitz .................. 331/25 |
| 7,952,408 B2 * | 5/2011 | Eisenstadt et al. ............ 327/231 |
| 8,258,877 B2 * | 9/2012 | Goel et al. ..................... 331/1 R |
| 2005/0157829 A1 * | 7/2005 | Aoyama et al. ................ 375/376 |
| 2009/0079441 A1 * | 3/2009 | Cathelin et al. ............... 324/613 |
| 2010/0033257 A1 * | 2/2010 | Pellerano et al. ............. 331/1 A |
| 2011/0025362 A1 * | 2/2011 | Zuckerman .............. 324/756.07 |
| 2011/0084771 A1 * | 4/2011 | Nagaraj et al. .......... 331/117 FE |

\* cited by examiner

*Primary Examiner* — Simon Nguyen
(74) *Attorney, Agent, or Firm* — McDermott Will & Emery LLP (57) ABSTRACT

A circuit for measurement of a phase noise of an oscillator may include the oscillator to generate a first signal having the same oscillation frequency as an instantaneous oscillation frequency of the oscillator. The circuit may include a first circuit that is configured to generate a second signal from the first signal. An instantaneous amplitude of the second signal may be related to the oscillation frequency of the first signal. A second circuit may be configured to integrate the second signal to generate a third signal. The third signal can be a measure of the phase noise of the oscillator. The third signal can be used to cancel some or all of the phase noise of the oscillator.

20 Claims, 7 Drawing Sheets

PHASE-NOISE REDUCTION TECHNIQUE USING FREQUENCY-TO-CURRENT CONVERSION WITH BASEBAND INTEGRATION

TECHNICAL FIELD

The present description relates generally to radio frequency (RF) communications, and more particularly, but not exclusively, to a phase-noise reduction technique using frequency-to-current conversion with baseband integration.

BACKGROUND

During the down-conversion step in a radio frequency (RF) receiver using a local oscillator (LO), the phase noise of the LO may result in degradation of the desired signal, for example, via a process known as reciprocal mixing. The LO phase noise, may arise from the effect of injected noise into the LO on the oscillation frequency of the LO. In reciprocal mixing, the phase noise of the LO may mix with an unwanted blocker signal to down-convert the blocker signal that can interfere with the desired signal as an additive noise on top of the desired signal. Blocker signals are unwanted signals that may include various wireless signals, e.g., cellular signals, Wi-Fi signals, and/or other wireless signal, which may crowd the airwaves.

Designers of radio receivers may need to consider ways to deal with large blocker signals. For example, in narrow band receivers, the undesirable effects of reciprocal mixing can be mitigated, in some instances, by filtering the unwanted blocker signal prior to the down-conversion step (e.g., by using RF filters such as off-the-chip band-pass filters). The additional filtering, however, may come at the expense of power, cost, and/or area. The undesirable effects of reciprocal mixing may also be mitigated by implementing oscillators that have minimal phase noise, such as LC-oscillators, which may also come at the expense of power, cost, and/or area.

Therefore, the need exist for a solution that can reduce the oscillator phase noise, at a reduced power, cost and/or area.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
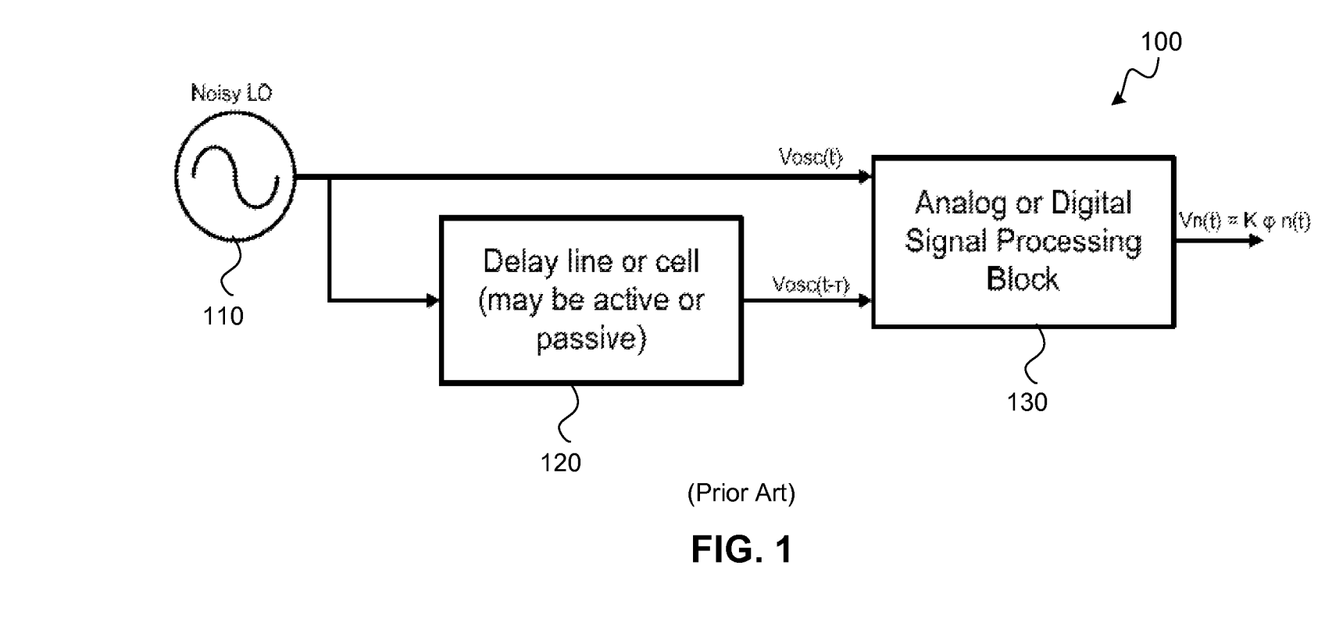
FIG. 1 illustrates a block diagram of a delay-cell discriminator circuit for measurement of a phase noise of an oscillator.

FIG. 1 illustrates a block diagram of a conventional delay-cell discriminator circuit 100 for measurement of a phase noise of an oscillator. The delay-cell discriminator circuit 100 may be used to measure a phase noise of a noisy oscillator 110. The delay-cell discriminator circuit 100 may include a delay cell (e.g., delay line) 120 and a signal processing block 130. A voltage signal Vosc(t) of the noisy oscillator 110 may be applied to the delay cell 120, which may be an active or passive circuit. The delay cell 120 may delay the voltage signal Vosc(t), by a delay time T, and generate a delayed signal Vosc(t−T). The signal processing block 130 my receive the voltage signal Vosc(t) and the delayed signal Vosc(t−T), and perform some sort of processing (e.g., analog or digital processing) to derive an output voltage Vn(t), which may be proportional to the phase noise of the noisy oscillator 110.

Figure 2:
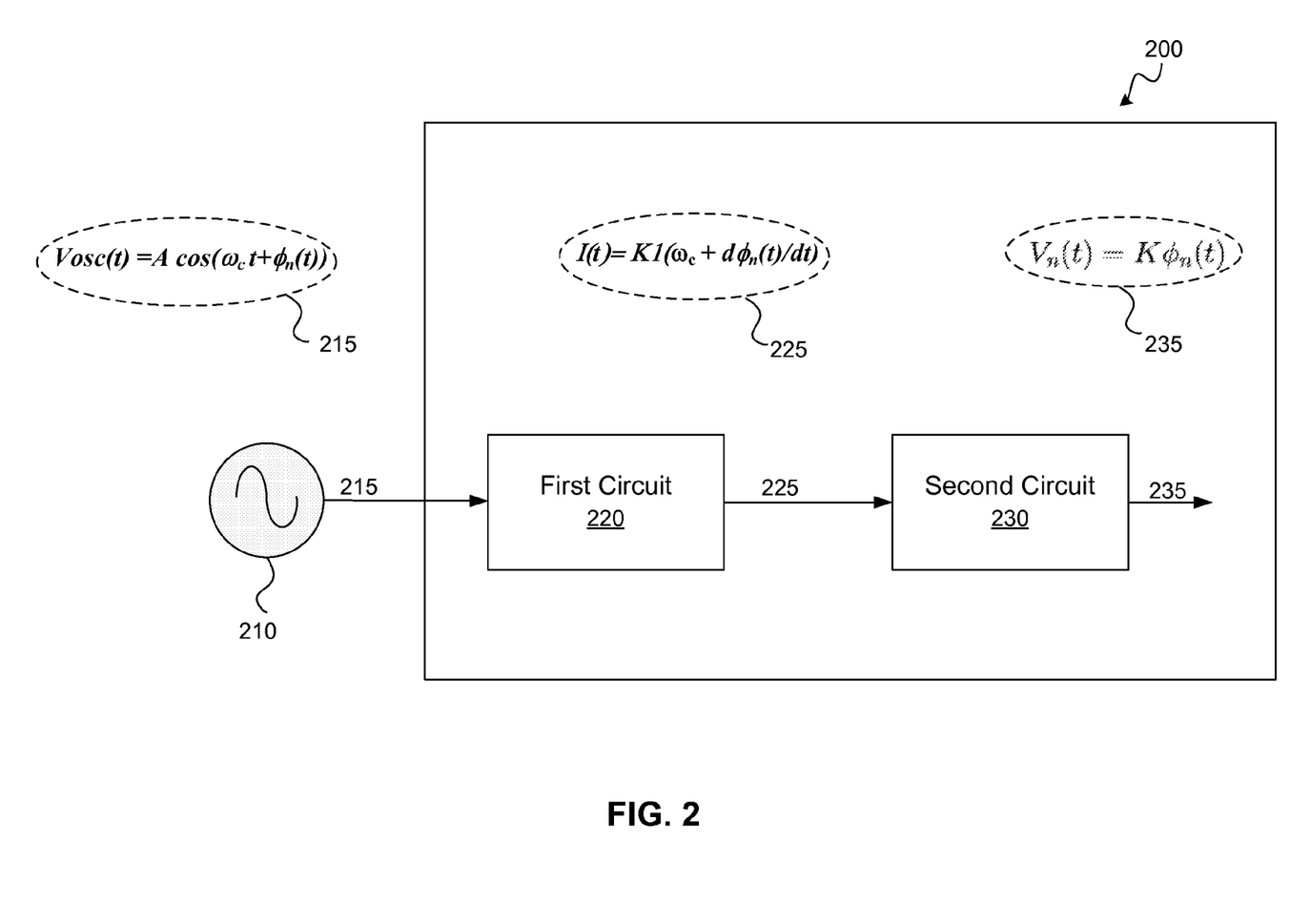
FIG. 2 illustrates a high-level block diagram of an example circuit for measurement of a phase noise of an oscillator in accordance with one or more implementations.

FIG. 2 illustrates a high-level block diagram of an example circuit 200 for measurement of a phase noise of an oscillator 210 in accordance with one or more implementations of the present invention. The circuit 200 may be used to measure a phase noise of the oscillator 210. The circuit 200 may include a first circuit 220 and a second circuit 230. The oscillator 210 may be a local oscillator (LO) of a mixer, such as a down conversion mixer, used in many RF communication (e.g., wireless communication) circuits.

The LO phase noise is the result of injection of noise into the oscillator by external means or the oscillator's constituent devices. Although the injected noise disturbs both amplitude and frequency of the output signal of the oscillator, only the disturbance to the frequency results in reciprocal mixing noise generation during the down-conversion step. The phase noise of the oscillator may be considered as a small time dependent random excess phase (e.g., $\phi_n(t) \ll 1$ rad). The phase noise is usually characterized in the frequency domain and may have a frequency spectrum that can symmetrically spread around the oscillation frequency $\omega_c$ of the oscillator. The oscillator phase noise may be quantified as the amount of noise power in a unit bandwidth at an offset $\Delta\omega$ with respect to the oscillation frequency $\omega_c$ of the oscillator.

The circuit 200 may receive a first signal 215 from the oscillator 210, and derive the phase noise from the oscillation frequency of the noisy LO by generating a current (or voltage) that may be directly related to the oscillation frequency of the LO. The derivation relies on the mathematical fact that the time derivative of the phase noise (e.g., $d\phi_n(t)/dt$) may be considered as a variation of the oscillation frequency $\omega_c$ of the oscillator. In other words, an instantaneous oscillation frequency $\omega(t)$ of the oscillator 210 may be expressed as: $\omega_c+d\phi_n(t)/dt$, where the constant portion $\omega_c$ is the noiseless oscillation frequency. The first signal 215 may be given by: $V_{osc}(t)=A \cos(\omega_c t+\phi_n(t))$, where $\phi_n(t)$ is the phase noise of the oscillator 210, and the frequency of the first signal may be the same as the instantaneous oscillation frequency of the oscillator 210.

The first circuit 220 may be configured to generate a second signal 225 from the first signal 215. An instantaneous amplitude (e.g., I(t) or V(t)) of the second signal 225 may be related (e.g., proportional to) the frequency of the first signal 215 (e.g., an instantaneous oscillation frequency of the oscillator 210). The second circuit 230 may be configured to process (e.g., integrate) the second signal 225 to generate a third signal 235 (e.g., a voltage signal, Vn(t)). The third signal 235 may be a measure of the phase noise of the oscillator 210 (e.g., $V_n(t)=K\phi_n(t)$).

Figure 3A:
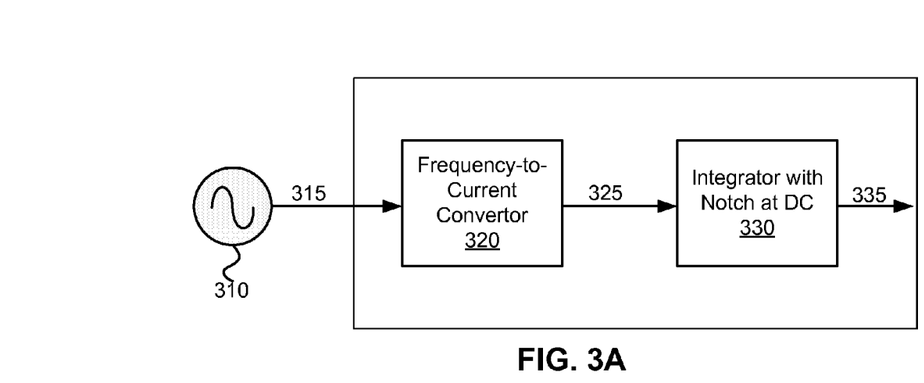
FIG. 3A illustrates an example block diagram of a circuit for measurement of a phase noise of an oscillator in accordance with one or more implementations.

FIG. 3A illustrates an example block diagram of a circuit 300 for measurement of a phase noise of an oscillator 310 in accordance with one or more implementations of the present invention. In an aspect of one implementation, the first circuit 220 of FIG. 2 may be implemented by a frequency-to-current converter 320. The frequency-to-current converter 320 may be configured to generate a current signal 325 (e.g., I(t)) from the first signal 315. An instantaneous amplitude of the second signal 325 may be related to (e.g., proportional to) the frequency of the first signal 315, which is the same as the instantaneous oscillation frequency of the oscillator 310. An integrator circuit 330 may be used to implement the second circuit 230 of FIG. 2. The integrator circuit 330 may be configured to integrate the second signal 325 to generate a third signal 335 (e.g., a voltage signal). The third signal 335 may be a measure of the phase noise of the oscillator 310, and may be used to reduce an actual phase noise of the oscillator 310. In an aspect of an implementation, the second signal 325 may be represented by: $I(t)=K1(\omega_c+d\phi_n(t)/dt,)$, which when integrated may produce a baseband signal that is proportional to the phase noise $\phi_n(t)$ of the oscillator 310. The integrator circuit 330, however, may be saturated due to a constant term (e.g., K1 ω) in the second signal 325, unless the integrator includes a notch filter to effectively reduce the near-zero frequencies (e.g., DC).

Figure 3B:
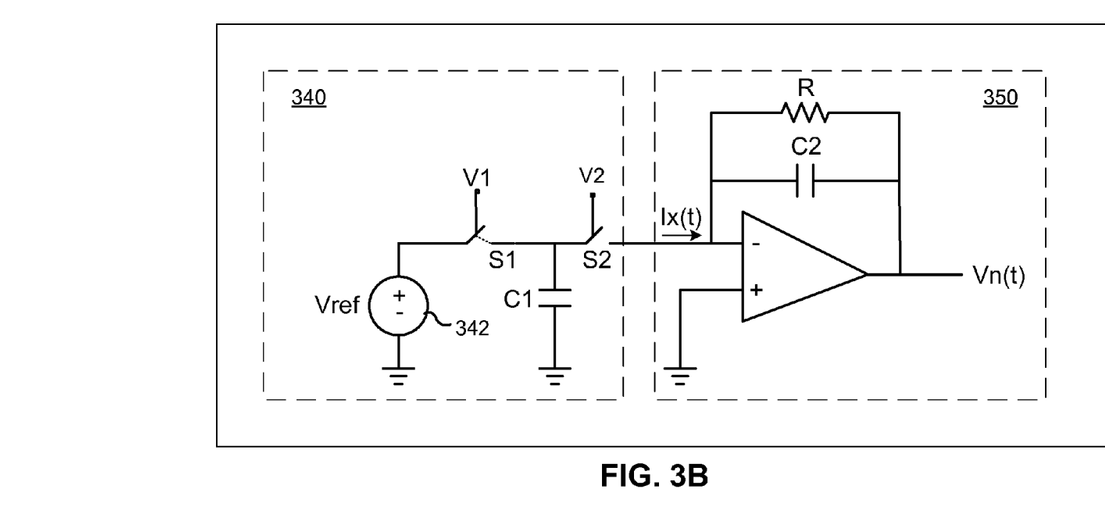
FIG. 3B illustrates an example implementation of the circuit of FIG. 3A in accordance with one or more implementations.

FIG. 3B illustrates an example implementation of the circuit 300 of FIG. 3A in accordance with one or more implementations. The frequency-to-current converter 320 of circuit 300 may be implemented by a switched-capacitor circuit 340. The switched-capacitor circuit 340 may include a reference voltage source 342, a first switch S1, a second switch S2, and a capacitor C1. The first and the second switches are controlled, respectively, with differential voltage signals V1 and V2, where the voltage signal V2 is an inverted version of the voltage signal V1. The voltage signal V1 may be the same as the first signal 315 of FIG. 3A (e.g., Vosc(t)). The switches S1 and S2 may, for example, be implemented by an MOS (e.g., NMOS) transistor. Accordingly, the switch S1 may be closed (the shown state of S1), thus charging capacitor C1, in a positive half cycle of the voltage signal V1, where the switch S2 is open. In a negative half cycle of the voltage signal V1, switch S1 may open and switch S2 may close to allow the capacitor C1 to discharge and generate a time dependent current Ix(t). Therefore, the current Ix(t) can be proportional to the frequency of voltage signal V1, which may be the same as the instantaneous frequency of the oscillator 310 of FIG. 3A (e.g., $\omega_c+d\phi_n(t)/dt$). It is understood that the implementation of the frequency-to-current converter 320 is not limited to the circuit 340, and other circuits (e.g., analog or digital) may be used to implement the frequency-to-current converter 320. Once integrated by an integrator circuit 350, the current Ix(t) may generate a baseband output voltage Vn(t), that is proportional to the phase noise $\phi_n(t)$ of the oscillator 310.

The integrator circuit 350 may be an example implementation of the integrator circuit 330 of FIG. 3A. The integrator circuit 350 may be a known integrator with a feedback capacitor C2 and a feedback resistor R. The current Ix(t) may be integrated as a voltage signal across the capacitor C2, which also appears as the baseband output signal Vn(t) of the integrator circuit 350. The resistor R may work as a DC notch filter for the integrator circuit 350, by simply attenuating the near-zero frequencies of the output signal Vn(t). Therefore, the output signal Vn(t) may, in effect, be a measure of the phase noise $\phi_n(t)$ of the oscillator 310. It is understood that the implementation of the integrator 330 is not limited to the circuit 350, and other circuits (e.g., analog or digital) may be used to implement the integrator 330.

Figure 4A:
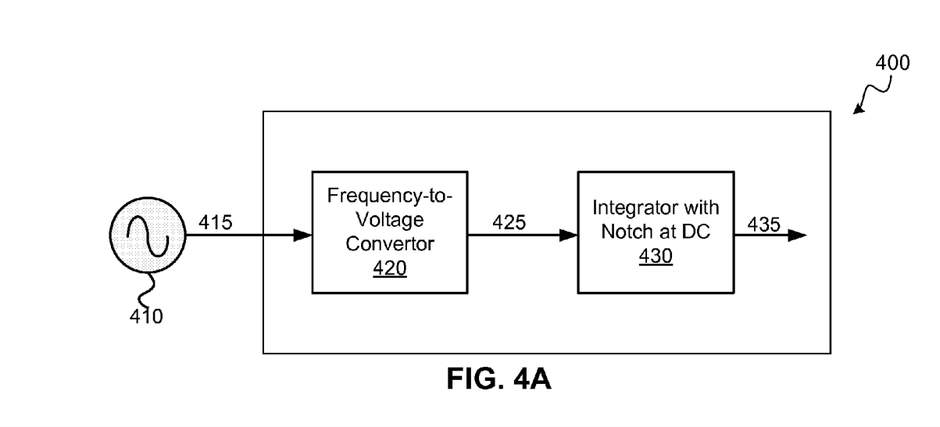
FIG. 4A illustrates an example block diagram of a circuit for measurement of a phase noise of an oscillator in accordance with one or more implementations.

FIG. 4A illustrates an example block diagram of a circuit for measurement of a phase noise of an oscillator in accordance with one or more implementations. In an aspect of one implementation, the first circuit 220 of FIG. 2 may be implemented by a frequency-to-voltage converter 420. The frequency-to-voltage converter 420 may be configured to generate a voltage signal 425 (e.g., V(t)) from the first signal 415 generated by an oscillator 410. An instantaneous amplitude of the voltage signal 425 may be related to (e.g., proportional to) the frequency of the first signal 415, which is the same as the instantaneous oscillation frequency of the oscillator 410. An integrator circuit 430 may be used to implement the second circuit 230 of FIG. 2. The integrator circuit 430 may be configured to integrate the voltage signal 425 to generate a third signal 435 (e.g., a baseband voltage signal). The third signal 435 may be a measure of the phase noise of the oscillator 410, and may be used to reduce an actual phase noise of the oscillator 410. As discussed above with respect to FIG. 3A, unless the integrator circuit 430 includes a DC notch filter, the integrator may saturate, and may not be able to generate a reliable result.

Figure 4B:
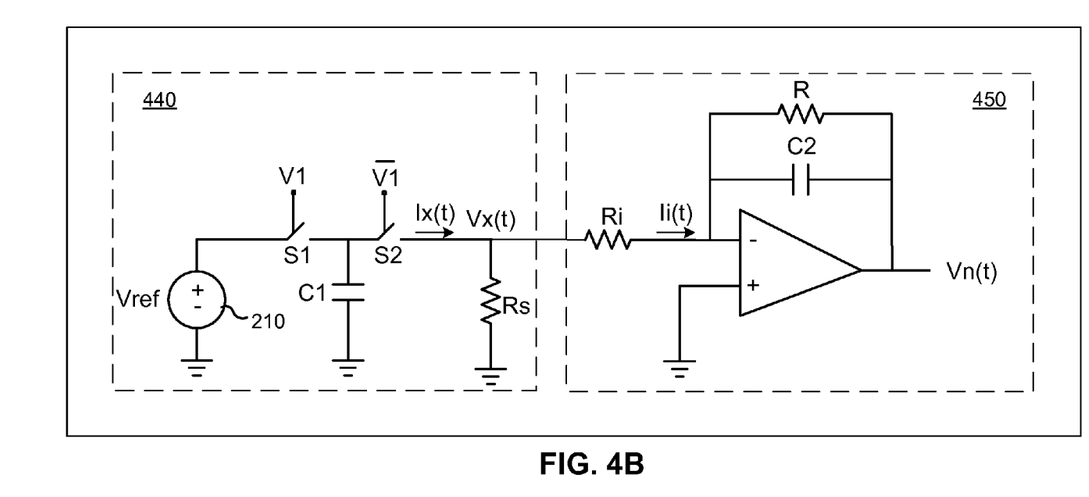
FIG. 4B illustrates an example implementation of the circuit of FIG. 4A in accordance with one or more implementations.

FIG. 4B illustrates an example implementation of the circuit 400 of FIG. 4A in accordance with one or more implementations. The frequency-to-voltage converter 420 may be implemented by a switched-capacitor circuit 440, which, to some extent, is similar to the switched-capacitor circuit 340 of FIG. 3B. In an aspect of an implementation, the switched-capacitor circuit 440 may have a resistor Rs that can generate a voltage signal Vx(t), which is proportional to the instantaneous frequency of the oscillator 410 of FIG. 4A (e.g., $\omega_c+d\phi_n(t)/dt$). It is understood that the implementation of the frequency-to-voltage converter 420 is not limited to the circuit 440, and other circuits (e.g., analog or digital) may be used to implement the frequency-to-voltage converter 420. Once integrated by an integrator circuit 450, the voltage signal Vx(t) may generate a baseband output voltage Vn(t), that is proportional to the phase noise $\phi_n(t)$ of the oscillator 410.

The integrator circuit 450 may be an example implementation of the integrator circuit 430 of FIG. 4A. The integrator circuit 450 is similar to the integrator circuit 350, except for the input resistor Ri that can provide a current Ii(t) from the voltage Vx(t) generated by the switched-capacitor circuit 440. In some aspects, the resistance value of resistor Ri may be substantially higher than the resistance value of the resistor Rs. The current Ii(t) may be integrated as the voltage across the capacitor C2, which also appears as the output signal Vn(t) of the integrator circuit 450. The resistor R may work as a DC notch filter for the integrator circuit 450, and may attenuate the near-zero frequencies of the output signal Vn(t). Therefore, the output Vn(t) may in effect, be a measure of the phase noise $\phi_n(t)$ of the oscillator 410, which may be used (e.g., in a feedback loop) to reduce an actual phase noise of the oscillator 410. It is understood that the implementation of the integrator 430 is not limited to the circuit 450, and other circuits (e.g., analog or digital) may be used to implement the integrator 430.

Figure 5:
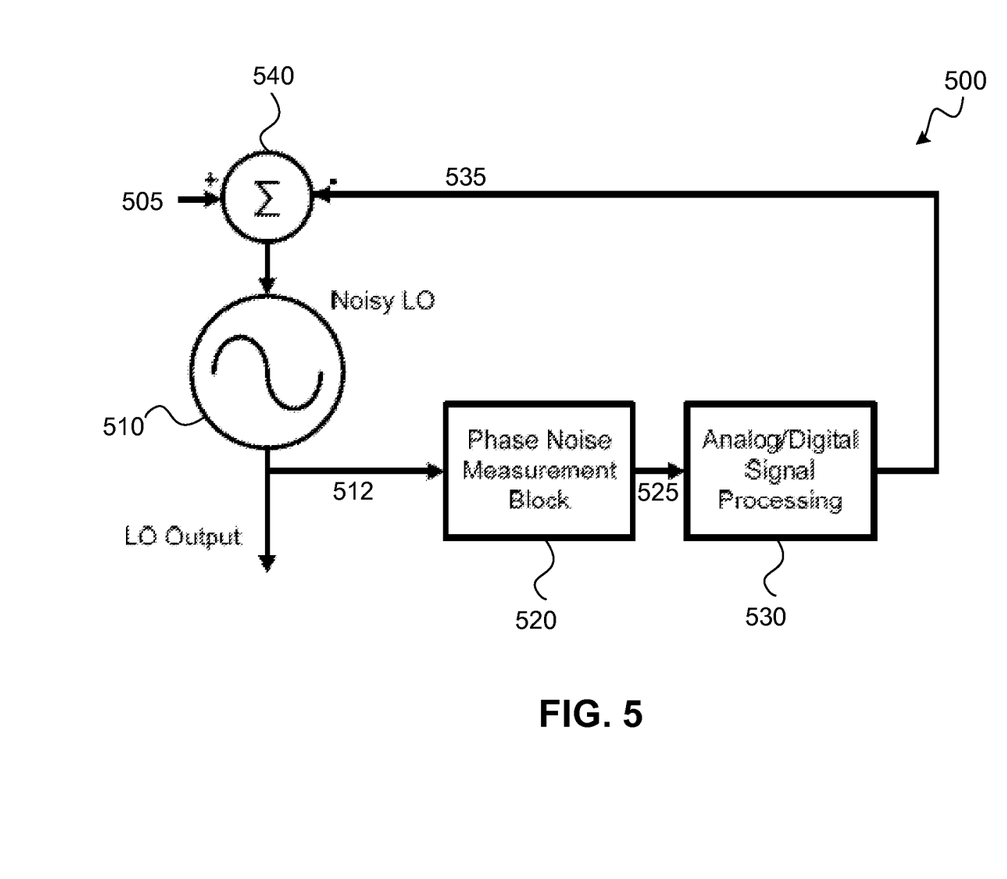
FIG. 5 illustrates an example circuit for reducing a phase noise of an oscillator by utilizing the circuit of FIG. 4A in accordance with one or more implementations.

FIG. 5 illustrates an example circuit 500 for reducing a phase noise of an oscillator by utilizing the circuit 400 of FIG. 4A in accordance with one or more implementations. The circuit 500 may use the phase noise measurement block 520 and the processing block 530 in a feedback loop to improve (e.g., reduce) a phase noise of the noisy oscillator 510. The circuit 500, therefore, may represent an application of the circuits discussed above in reducing the phase noise of an oscillator (e.g., the oscillator 510). For example, the phase noise measurement block 520 may be implemented by the phase noise measurement circuit 200 of FIG. 2 (or by one of the circuits 300 of FIG. 3A or 400 of FIG. 4A). The phase noise measurement block 520 may utilize the phase noise measurement circuits disclosed herein to generate a measured phase noise signal 525 from an output signal 512 received from the oscillator 510.

The processing block 530 may receive the measured phase noise signal 525 and perform one or more processing (e.g., analog or digital) on the received signal and generate a processed phase noise signal 535. The processing performed by the processing block 530 may include generating the processed phase noise signal 535, which may be a time-varying DC voltage or current signal related (e.g., proportional to) the phase noise of the oscillator 510. The processed phase noise signal 535 may be subtracted, in a subtraction module 540, from an input 505 (e.g., a voltage or current bias) of the oscillator 510, to improve (e.g., reduce) the phase noise of the oscillator 510. The applications of the phase noise measurement circuits discussed herein are not limited to the circuit 500. Other circuits/techniques may use the measured phase noise, by the phase noise measurement circuits discussed herein, to reduce the phase noise of oscillators. The phase noise measurement circuits discussed herein may be used in other configurations and applications, for example, to cancel reciprocal mixing noise of mixers (e.g., down conversion mixers) used in many RF (e.g., wireless) communication circuits.

Figure 6:
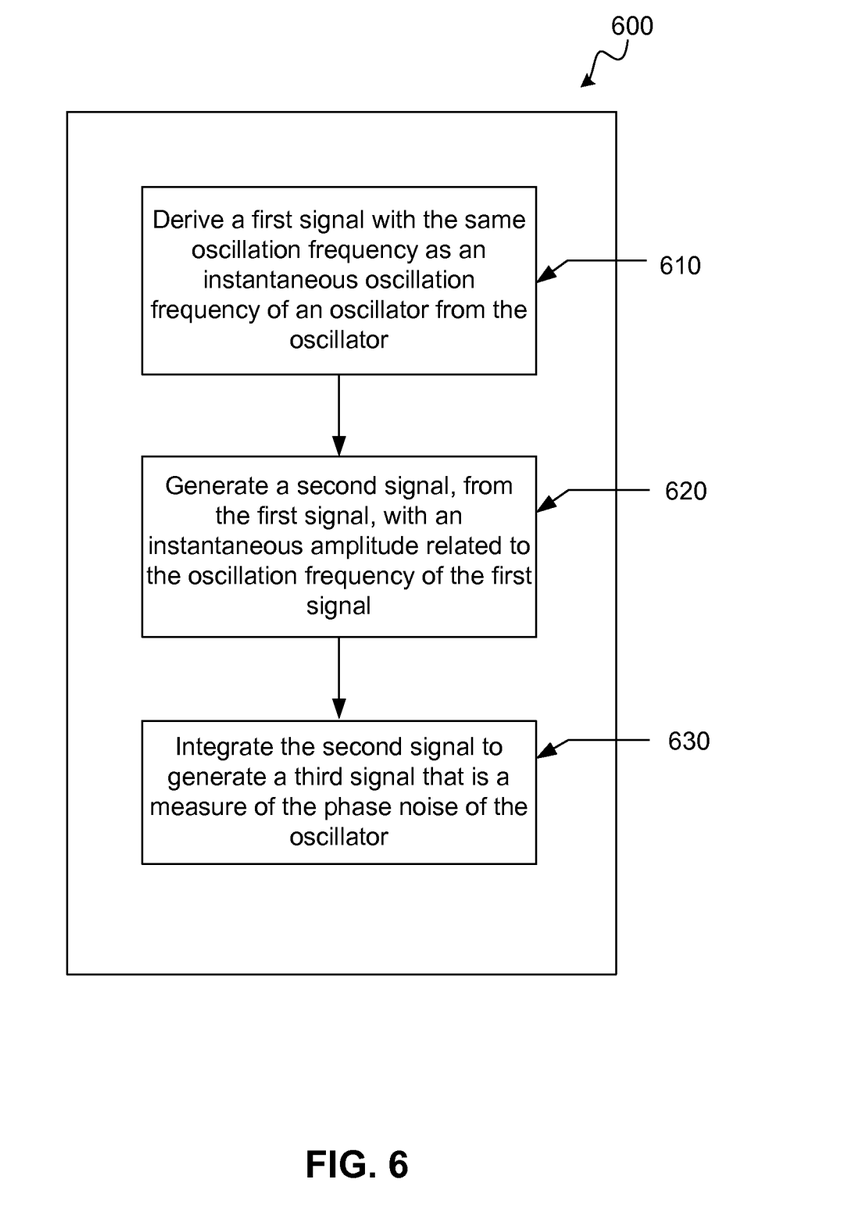
FIG. 6 illustrates a flow diagram of an example method for measurement of a phase noise of an oscillator in accordance with one or more implementations.

FIG. 6 illustrates a flow diagram of an example method 600 for measurement of a phase noise of an oscillator in accordance with one or more implementations. For explanatory purposes, example method 600 is described herein with reference to the circuit 200 of FIG. 2, the circuit 300 of FIG. 3A, or the circuit 400 of FIG. 4A; however, example method 600 is not limited to these circuits. Further for explanatory purposes, the blocks of example method 600 are described herein as occurring in serial, or linearly. However, multiple blocks of example method 600 may occur in parallel. In addition, the blocks of example method 600 need not be performed in the order shown and/or one or more of the blocks of example method 600 need not be performed.

The method 600 includes an operation 610, where a first signal (e.g., 215 of FIG. 2, 315 of FIG. 3A, or 415 of FIG. 3B) may be derived from an oscillator (e.g., 210 of FIG. 2, 310 of FIG. 3A, or 410 of FIG. 4A). The frequency of the first signal may be the same as an instantaneous frequency of the oscillator. At operation 620, the first circuit 220 of FIG. 2 may generate a second signal (e.g., 225 of FIG. 2, 325 of FIG. 3A, or 425 of FIG. 4A) from the first signal. An instantaneous amplitude of the second signal my be related to the oscillation frequency of the first signal. At operation 630, the second circuit 230 of FIG. 2 may integrate the second signal to generate a third signal (e.g., 235 of FIG. 2, 335 of FIG. 3A, or 435 of FIG. 4A). The third signal may be a measure of the phase noise of the oscillator.

Figure 7:
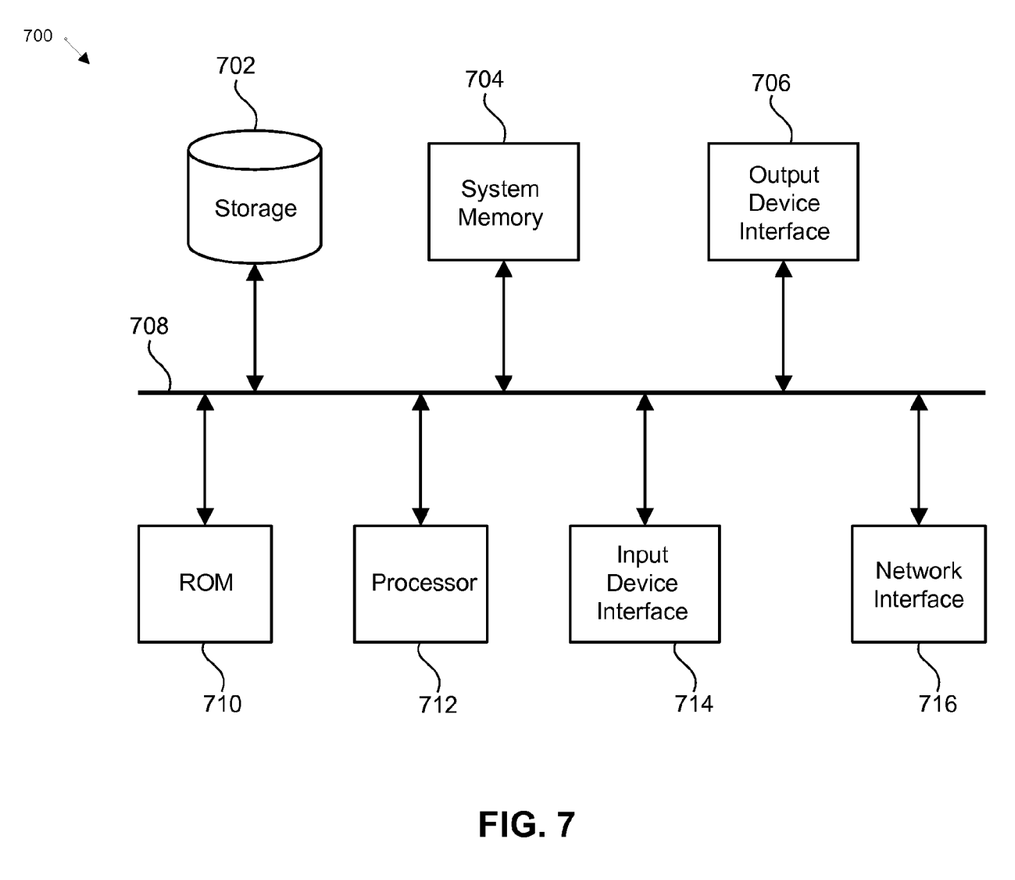
FIG. 7 conceptually illustrates an electronic system with which some implementations of the subject technology may be implemented.

FIG. 7 conceptually illustrates an electronic system 700 with which some implementations of the subject technology may be implemented. Electronic system 700, for example, can be a desktop computer, a laptop computer, a tablet computer, a server, a switch, a router, a base station, a receiver, a phone, a personal digital assistant (PDA), or generally any electronic device that transmits signals over a network. Such an electronic system may include various types of computer readable media and interfaces for various other types of computer readable media. Electronic system 700 includes bus 708, processing unit(s) 712, system memory 704, read-only memory (ROM) 710, permanent storage device 702, input device interface 714, output device interface 706, and network interface 716, or subsets and variations thereof.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. One or more implementations of the subject disclosure use a mass-storage device (such as a magnetic or optical disk and its corresponding disk drive) as permanent storage device 702.

Other implementations may use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations.

Bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touch-screen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, bus 708 may also couple electronic system 700 to a network (not shown) through network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

Many of the above-described features and circuits may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

11 structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for measurement of a phase noise of an oscillator, the circuit comprising:
    a first circuit configured to generate a second signal from a first signal, wherein the first signal is generated by the oscillator at a frequency ($\omega_c$) and includes a phase noise ($\phi_n(t)$) of the oscillator, and wherein an instantaneous amplitude of the second signal is proportional to a summation of the frequency ($\omega_c$) of the first signal and a time derivative of the phase noise of the first signal ($d\phi_n(t)/dt$); and
    a second circuit configured to integrate the second signal to generate a third signal, the third signal being a measure of the phase noise of the oscillator.

2. The circuit of claim 1, wherein the first circuit is configured to utilize the first signal to generate at least one of a current signal or a voltage signal based on the oscillation frequency of the first signal.

3. The circuit of claim 1, wherein the first circuit is a frequency-to-current converter circuit that is configured to utilize the first signal to generate a current signal based on the frequency of the first signal.

4. The circuit of claim 1, wherein the first circuit is a frequency-to-voltage converter circuit that is configured to utilize the first signal to generate a voltage signal based on the frequency of the first signal.

5. The circuit of claim 1, wherein the second circuit is configured to integrate the second signal and to eliminate an effect of the noiseless oscillation frequency on the third signal.

6. The circuit of claim 1, wherein the second circuit comprises an integrator circuit configured to integrate the second signal and to substantially attenuate near-zero frequency signals.

7. The circuit of claim 1, wherein the first circuit comprises a switched-capacitor circuit configured to utilize the first signal to generate at least one of a current signal or a voltage signal based on the oscillation frequency of the first signal.

8. The circuit of claim 7, wherein the switches of the switched-capacitor circuit are controlled by the first signal and an inverted version of the first signal.

9. The circuit of claim 1, wherein the first signal comprises a time varying voltage signal derived from an output signal of the oscillator.

10. A method for measurement of a phase noise of an oscillator, the method comprising:
 deriving a first signal from the oscillator, wherein the first signal is generated by the oscillator at a frequency ($\omega_c$) and includes a phase noise $\phi_n(t)$) of the oscillator; an instantaneous of the oscillator;
 generating a second signal from the first signal, wherein an instantaneous amplitude of the second signal is proportional to a summation of the frequency ($\omega_c$) of the first signal and a time derivative of the phase noise of the first signal ($d\phi_n(t)/dt$); and
 integrating the second signal to generate a third signal, the third signal being a measure of the phase noise of the oscillator.

11. The method of claim 10, wherein the generating of the second signal from the first signal comprises generating at least one of a current signal or a voltage signal based on the oscillation frequency of the first signal.

12. The method of claim 10, wherein the generating of the second signal from the first signal comprises using a frequency-to-current converter circuit and utilizing the first signal to a generate a current signal based on the frequency of the first signal.

13. The method of claim 10, wherein the generating of the second signal from the first signal comprises using a frequency-to-voltage converter circuit and utilizing the first signal to generate a voltage signal based on the frequency of the first signal.

14. The method of claim 10, wherein the integrating of the second signal comprises eliminating an effect of the noiseless oscillation frequency on the third signal.

15. The method of claim 10, wherein the integrating of the second signal comprises using an integrator that substantially attenuates near-zero frequency signals.

16. The method of claim 10, wherein generating the second signal from the first signal comprises using a switched-capacitor circuit and utilizing the first signal to generate at least one of a current signal or a voltage signal based on the frequency of the first signal.

17. The method of claim 10, wherein the deriving of the first signal from the oscillator comprises deriving a time varying voltage signal from an output signal of the oscillator.

18. The method of claim 10, wherein generating the second signal comprises using a switched-capacitor circuit and configuring the switched-capacitor circuit to utilize the first signal to generate at least one of a current signal or a voltage signal or a current signal based on the oscillation frequency of the first signal.

19. A non-transitory machine-readable medium embodying instructions that, when executed by a machine, allow the machine to perform a method for measurement of a phase noise of an oscillator, the method comprising:
 deriving a first signal from the oscillator, wherein the first signal is generated by the oscillator at a frequency (($\omega_c$) and includes a phase noise ($\phi_n(t)$) of the oscillator;
 generating a second signal from the first signal, wherein an instantaneous amplitude of the second signal is proportional to a summation of the frequency ($\omega_c$) of the first signal and a time derivative of the phase noise of the first signal ($d\phi_n(t)/dt$); and
 integrating the second signal to generate a third signal, the third signal being a measure of the phase noise of the oscillator.

20. The non-transitory machine-readable medium of claim 19, wherein:
 a) the generating of the second signal from the first signal comprises generating at least one of a current signal or a voltage signal based on the frequency of the first signal,
 b) the generating of the second signal from the first signal comprises using a frequency-to-current converter circuit and utilizing the first signal to a generate a current signal based on the frequency of the first signal, and c) the integrating of the second signal comprises using an integrator that substantially attenuates near-zero frequency signals.

* * * * *